United States Patent
Shannon et al.

(10) Patent No.: US 11,860,995 B2
(45) Date of Patent: Jan. 2, 2024

(54) METHOD TO IMPLEMENT TRACEABILITY AND PROVABILITY IN SOFTWARE DEVELOPMENT

(71) Applicant: United States of America, as represented by the Secretary of the Navy, Patuxent River, MD (US)

(72) Inventors: Russell Shannon, Mays Landing, NJ (US); Joseph Garcia, La Plata, MD (US); Aaron Jacobson, King George, VA (US); William Mosca, Morristown, NJ (US); Roberto Maldonado, Lusby, MD (US); Michael Burger, Toms River, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 138 days.

(21) Appl. No.: 17/401,847

(22) Filed: Aug. 13, 2021

(65) Prior Publication Data

US 2023/0048589 A1    Feb. 16, 2023

(51) Int. Cl.
*G06F 21/53* (2013.01)
*G06F 21/54* (2013.01)
(Continued)

(52) U.S. Cl.
CPC ............. *G06F 21/53* (2013.01); *G06F 21/54* (2013.01); *G06F 21/552* (2013.01);
(Continued)

(58) Field of Classification Search
CPC ........ G06F 21/53; G06F 21/54; G06F 21/552; H04L 9/3236; H04L 9/3247
See application file for complete search history.

(56) References Cited

U.S. PATENT DOCUMENTS

| 2019/0065709 A1* | 2/2019 | Salomon | H04L 9/0643 |
| 2019/0132350 A1* | 5/2019 | Smith | G06Q 20/40 |

(Continued)

OTHER PUBLICATIONS

Sandip Bankar • Deven Shah; Blockchain based framework or Software Development using DevOps; 2021 4th Biennial International Conference on Nascent Technologies in Engineering (ICNTE) (pp. 1-6); (Year: 2021).*

(Continued)

*Primary Examiner* — Luu T Pham
*Assistant Examiner* — Chao Wang
(74) *Attorney, Agent, or Firm* — Mark O. Glut; NAWCAD

(57) ABSTRACT

A method to implement traceability and provability on a particular project in software development based on blockchain-recorded transactions of assigned developer time, the method comprising of the following steps: setting up a blockchain network comprised of a distributed, redundant, and tamper-resistant ledger; issuing each user an attestable pre-fabricated and signed virtualized environment on approved hardware that comes with functionality required for the user's role implemented as one of a set of virtual machine templates fashioned from a signed and approved pre-fabricated image; and verifying that assigned developer time is valid, and if so, record each development action on the ledger to enable extensive tracking and auditing of end-to-end software development process.

1 Claim, 3 Drawing Sheets

Figure 1:
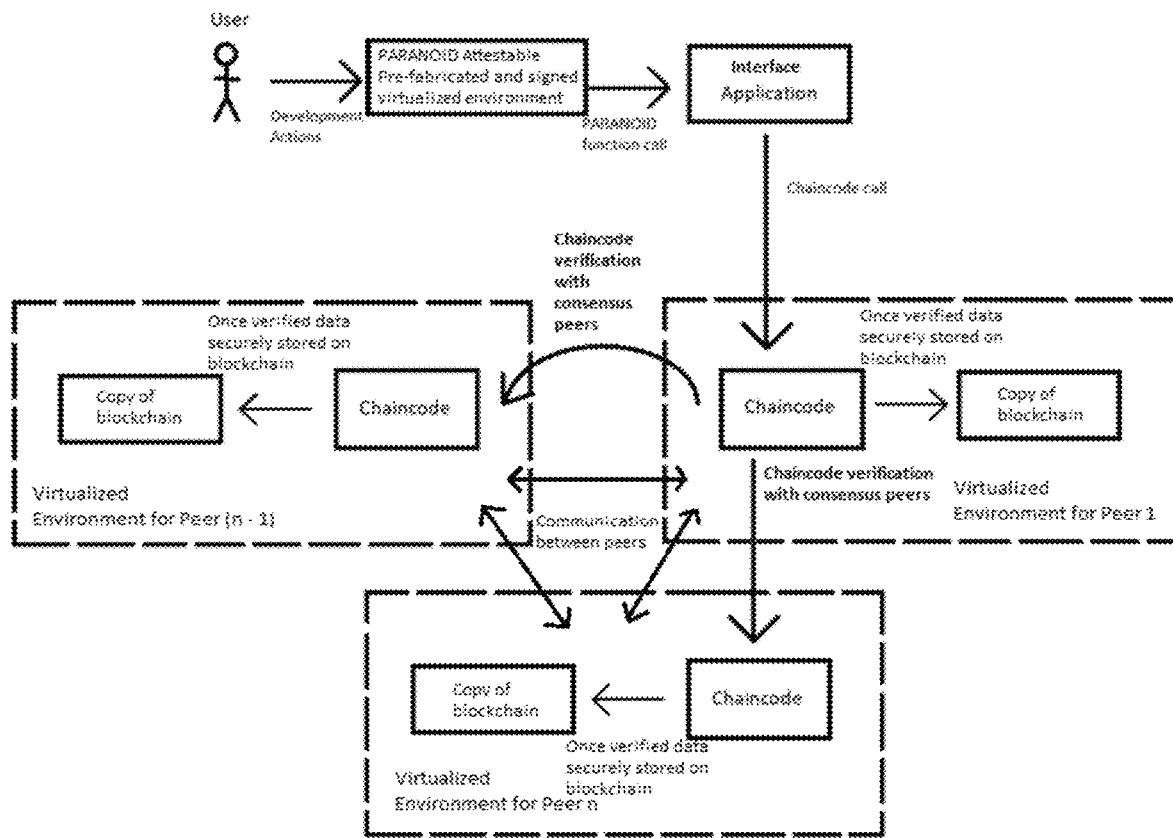

(51) Int. Cl.
*G06F 21/55* (2013.01)
*H04L 9/32* (2006.01)
*H04L 9/00* (2022.01)

(52) U.S. Cl.
CPC .......... *H04L 9/3236* (2013.01); *H04L 9/3247* (2013.01); *H04L 9/50* (2022.05)

(56) References Cited

U.S. PATENT DOCUMENTS

2020/0034945 A1* 1/2020 Soundararajan ...... H04L 9/3271
2020/0367054 A1* 11/2020 Obaidi .................... G06F 21/51

OTHER PUBLICATIONS

Md Jobair Hossain Faruk • Santhiya Subramanian • Hossain Shahriar • Maria Valero • Xia Li • Masrura Tasnim; Software Engineering Process and Methodology in Blockchain-Oriented Software Development: A Systematic Study; 2022 IEEE/ACIS 20th International Conference on Software Engineering Research; (Year: 2022).*

B. Ramesh • M. Jarke; Toward reference models for requirements traceability; IEEE Transactions on Software Engineering (vol. 27, Issue: 1, pp. 58-93); (Year: 2001).*

* cited by examiner

US 11,860,995 B2

METHOD TO IMPLEMENT TRACEABILITY AND PROVABILITY IN SOFTWARE DEVELOPMENT

STATEMENT OF GOVERNMENT INTEREST

The invention described herein may be manufactured and used by or for the Government of the United States of America for governmental purposes without payment of any royalties thereon or therefor.

BACKGROUND

Currently, versioning tools used in DevOps systems (secure software development systems) have the capability to detect corruption of software project source code, scripts, binaries, and other associated files. These versioning tools do not have the specific ability to prevent malicious activity, although they may aid in providing some degree of cybersecurity hardening. DevOps systems have procedures such as source code check-out/check-in. DevOps systems may not have built in safeguards to prevent builds on source code that did not go through normal check-in/check-out processes. Therefore, it might be possible, for example, to attack a development computer's operating system or the computer's software used to create software (the development environment).

Traditionally, DevOps security has been implemented by strict adoption of security best practices, such as the NIST Risk Management Framework (RMF), or NIST Special Publication 837 (NIST SP 837). This basis for DevOps security is limited because the software development tools (i.e., the toolchains) themselves can have exploitable vulnerabilities. Traditionally, a DevOps system will take toolchain products from the toolchain vendor with little to no questions regarding vulnerabilities. In an attack on a DevOps system, an attacker could exploit these vulnerabilities. Existing DevOps systems lack the ability to detect changes indicative of a cyberattack. In such an attack, the toolchain itself can be modified such that it would perform a system build with embedded malicious functionality (e.g., malware insertion). In addition to the toolchain, the operating system components of a development computer could be exploited and modified such that source code files or build scripts could subsequently be modified.

There are a few similar efforts taking place in the field. Chief among these is the Platform One initiative led by the US Air Force. Platform One is an official DoD DevSecOps Enterprise Services team. Their goal is also securing software development environments. Though the current invention is more than simply applying blockchain technology to DevOps, there are other enterprise blockchain technologies that might be applied to software DevOps to provide a somewhat non-reputable record of DevOps actions.

SUMMARY

The present invention is directed to a method to implement traceability and provability in software development based on blockchain transactions of assigned developer time with the needs enumerated above and below.

The present invention is directed to a method that tracks a project or program's software developers performing critical development operations such as software source code edits, compilation, and linking (software system builds) during software development for the purpose of traceability and provability that any executable binaries were produced by developers approved by the organization that owns the software. The described invention may also be referred to as the method "Powerful Authentication Regime Applicable to Naval OFP Integrated Development," or simply "PARANOID."

The invention is directed to a method to implement traceability and provability on a particular project in software development based on blockchain-recorded transactions of assigned developer time, the method comprising of the following steps: setting up a blockchain network comprised of a distributed, redundant, and tamper-resistant ledger, the ledger stored redundantly among a network of nodes, each node storing its own identical copy in a blockchain service design, the ledger storing records of transactions involving developers performing critical development functions in software development, the development functions comprising of performing source code edits; performing compilations; performing linking to create executable binaries, performing manipulation of binary with a packer to provide for memory efficient storage of the binary; and performing a manipulation of one or more binaries to create a distribution and installation format for distributing software to an endpoint target platform to provide for the convenient and correct installation of software on the endpoint target platform; issuing each user an attestable pre-fabricated and signed virtualized environment on approved hardware that comes with functionality required for the user's role implemented as one of a set of virtual machine templates fashioned from a signed and approved pre-fabricated image, the users' virtualized environments issue commands to the blockchain network based on user actions, the network of nodes communicate amongst themselves via blockchain consensus protocols to manage the state of the ledger and any updates that result from those issued commands; and, verifying that assigned developer time is valid, and if so, record each development action on the ledger to enable extensive tracking and auditing of end-to-end software development process.

It is a feature of the present invention to provide a method that proves that a binary load to a target computing system is: 1) produced (developed) by the authorized developers; 2) developed using authorized software development tools; 3) developed on authorized development hosts; and 4) developed during the approved development schedule.

It is a feature of the present invention to provide a method whereby all critical development functions (e.g., editing, compiling, and linking) are implemented by software development tools (e. g., editors, compilers, and linkers). A set of specific development tools used for sequentially implemented development functions is sometimes referred to in the art as a "toolchain." It is a feature of the present invention to include toolchains that are provably unmodified from their approved versions.

It is a feature of the present invention to permit only authorized developers during the authorized timeframe to execute critical development functions. This functionality is achieved via the use of a Time-limited Authorized Developer Action (TADA) token. A token, may be defined, but without limitation, as a digital quantity representing a unit of time that can be spent performing development actions on the PARANOID network. This invention has transfers that are cryptographically signed in a manner that if the signing private key is maintained securely, such signatures cannot be forged. TADA quantities are securely created by an organization's High Level Authority (HLA) where they are cryptographically signed and distributed through the established management/administrative hierarchy of the development organization, and are ultimately issued to the project developers corresponding to their authorized development schedule. The TADA allotment is proportional to assigned development time. It is arbitrary and can be specified to meet the needs of the developer organization. Units of TADA are commensurate with time scales for development actions to complete, seconds appear to be an appropriate choice (e.g. . . . , 1 TADA token equals 1 second).

It is a feature of the present invention to provide a method that is an integrated secure software development (DevSecOps) system providing traceability and provability for all outputs.

DRAWINGS

These and other features, aspects and advantages of the present invention will become better understood with reference to the following description and appended claims, and accompanying drawings wherein:

FIG. 1 shows an overview of how a user would interact with the PARANOID software. The user would select to perform a development action through the PARANOID interface, which would then issue a command to the PARANOID network to complete that action. In the PARANOID network, the virtualized environments would communicate with each other to come to a "consensus" on the validity of transactions and store the data from valid transactions in their respective ledgers (i.e., their respective copies of the blockchain).

Figure 2:
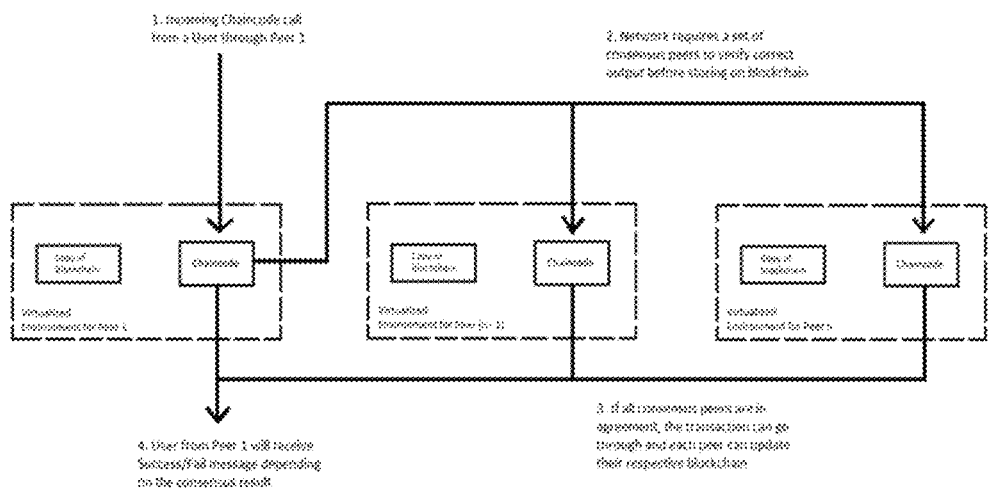

FIG. 2 shows a more in-depth view of how a network of virtualized environments might interact during the consensus process. When a virtualized environment for a peer receives a chaincode call (i.e., code that runs on the blockchain) from the PARANOID interface, it creates a transaction and communicates with the other virtualized environments in the network to see if the majority concur that the transaction is valid. If the majority agrees, the transaction is stored on all of the virtualized environments' respective ledgers (i.e., each node's copy of the entire blockchain). The user who sent the call to the virtualized environment will receive a notification of success or failure.

Figure 3:
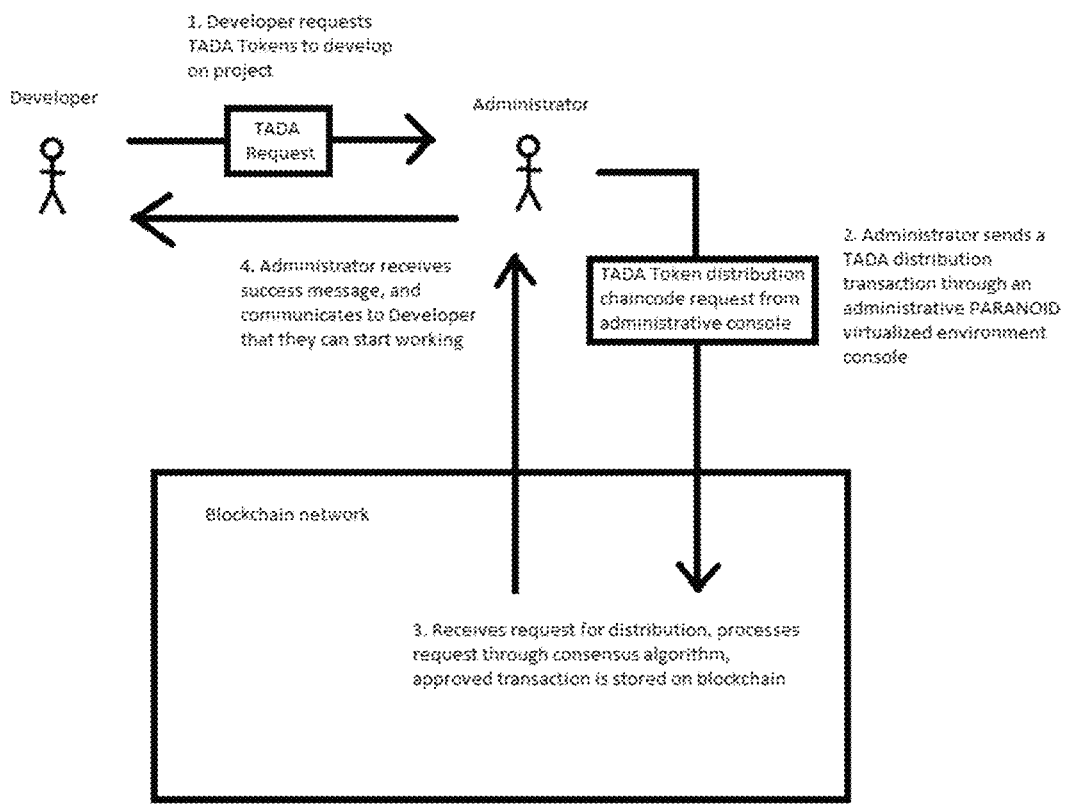

FIG. 3 shows how an administrator could distribute TADA Tokens to a developer. First, the developer would request TADA tokens from the administrator. The administrator would then decide on an amount to distribute and use a specialized administrative PARANOID virtualized environment to send this distribution to the developer. Using the aforementioned environment, a transaction for this distribution would be transmitted to the blockchain network and processed through a consensus algorithm. If the transaction is approved (i.e., the network has reached consensus by a majority of the blockchain nodes agreeing that the transaction is valid), the distribution would be stored on the ledger. The administrator would receive a success message, and could communicate to the developer that work could begin.

DESCRIPTION

The preferred embodiments of the present invention are illustrated by way of example below and in FIGS. 1-3. As seen in FIG. 1, the method to implement traceability and provability on a particular project in software development based on blockchain transactions of assigned developer time includes the following steps: setting up a blockchain network comprised of a distributed, and therefore highly tamper-resistant, ledger distributed among a network of nodes; issuing each user an attestable pre-fabricated and digitally signed virtualized environment on approved hardware that comes with all of the functionality required for the user's role on the project implemented as one of a set of virtual machine templates fashioned from a digitally signed and approved pre-fabricated image, the users' virtualized environments issue commands to the blockchain network based on user actions, the network of nodes communicate amongst themselves via blockchain consensus protocols to manage the state of the ledger and any updates that result from those issued commands; and, verifying that assigned developer time is valid, and if so, record each development action on the ledger to enable extensive tracking and auditing of the end-to-end software development process.

The method is initially intended to support the secure development of Operational Flight Programs (OFPs) for various Naval Aviation Enterprise (NAE) aircraft programs and their various avionics systems in NAE Software Support Activities (SSAs). In the description of the present invention, the invention will be discussed in a military environment; however, this invention can be utilized for any type of application that requires use of a method to implement traceability and provability in software development. DevSecOps is a set of practices that combines software development, IT operations, and security. PARANOID accomplishes integrated DevSecOps, whereby each successive stage of software development uses trusted, secure virtual machines or containers (a container may be defined, but without limitation, as an operating system virtualization). The containers include development tools that perform critical development functions with the ability to: 1) embed signatures and meta-data in the output of a particular function; and 2) dispatch transaction messages to blockchain processing nodes. A function may also be referred to as a stage or action. These functions are executed by a trusted software that implements a "transaction" based on assigned developer time, whereby some amount of assigned developer time is "expended." The expenditure of developer time is represented on the blockchain. Each development action is an expenditure of assigned development time, tracked using Time-limited Authorized Developer Action (TADA) tokens. In the execution of a critical development function, the processor chip on the development host executing the tool performing the specific critical development operation "attests" that it is the corresponding memory image of the specific tool binary of the approved DevOps software. Software determined not to be subject to unauthorized modifications is a result of a technical process implemented by specialized circuitry integrated on a processor microchip. The attestation function is a component of secure enclave technology that protects the integrity of an application. Examples of enclave technology include, but without limitation, Intel Corporation SGX® or ARM Ltd. TrustZone®. Such technology is CPU hardware technology, not software reachable, and therefore is very difficult to compromise. The attestation is protected by a cryptographic signature generated by a CPU resident private cryptographic key. This key is not accessible via software. The attestation is executed on every tool that performs every critical development function. Furthermore, the attestation function generates an attestation report at the time the critical function is performed. Data from the attestation report is a component of the development function's output embedded metadata and signature of the binary, and also part of the transaction message dispatched by the secure development environment to the PARANOID blockchain network. The message gets incorporated into the blockchain. This provides proof that a specific critical development function was performed with the unaltered DevOps tools, as approved by the organization.

In a preferred embodiment of the method, a developer utilizing the current invention must have received some assigned quantity of TADA tokens issued to him or her via the organizational chain of authority in order to perform development. A quantity of TADA tokens is securely created by a High Level Authority (HLA), which might be the organization's Chief Engineer (CHENG), Chief Information Officer (CIO), or Chief Technology Officer (CTO). Subsequently, the TADA tokens are distributed through the organization's management chain via distribution transactions represented on the blockchain until it reaches development supervisors, and ultimately the developers themselves. The process of distributing these TADA tokens can be seen in FIG. 3. Distributions of TADA token allocations are stored on the tamper-resistant blockchain, and are referenced to keep track of and enforce a developer's authorized schedule. A transaction charging (pricing) model is applied to performing development on the SDE and charges the difference in remaining balance over the time to the software project's deadline. This charging model enforces that all TADA tokens will be expended by the deadline of a software development program. In one embodiment of the invention, one (1) unit of TADA represents one (1) second of developer time. For a project that has a deadline of one (1) year upon creation of a specific line of TADA, means thirty one million, five hundred thirty six thousand (31,536,000) TADA tokens must be created and distributed at the start of the project for each developer on the project. Once the specific developer has received his/her assigned allocation of TADA tokens, he or she can start development work by editing a source code file. The developer performs the development utilizing the invention's Secure Development Environment (SDE). In the SDE variant that supports development on the developer's client, any assigned developer can edit his/her source code as desired. When the developer wants to check-in his/her work to the PARANOID network, the user saves their work by invoking the PARANOID edit transaction process. In this process, the SDE creates a mathematical "hash" of the main memory image of the editor, based on the aforementioned secure enclave technology. The hash is incorporated into the attestation report, which subsequently is incorporated into the edit transaction message to the blockchain processing nodes. It then generates a hash of the input source code module, and the SDE resident on the developer client generates an attestation report. Subsequently, the developer client SDE saves the file locally to the user's development environment and gathers local information about the developer and the source code file being saved. This information is sent as a transaction message to the PARANOID network to be stored on the blockchain upon the network reaching "consensus" for incorporating and ordering transaction records in blockchains.

This invention is independent of the consensus algorithm used in the blockchain. Variations of this invention may use different consensus algorithms without changing the core functionality of this invention. From the SDE implementing the edit function, as residing on the developer's client host, the information sent to the blockchain processing nodes as a transaction record contains multiple fields. Those fields include the fully qualified path of the source code file, the current hash of the source code, and, if one exists, the hash of the previous version of the source code. Other included fields are the virtual wallet address that will receive the amount of TADA tokens in the transaction, and the virtual wallet address that will be charged TADA tokens for this transaction. (The virtual wallets exist as blockchain entries of TADA allotments versus TADA charges). The information sent to the blockchain will be validated on the PARANOID network, as shown in FIG. 2. Any subsequent edit of a file will create an updated transaction, again represented on the blockchain. This provides a full edit history of the file from its creation until its current state.

PARANOID is interoperable with versioning systems such as Git, and is able to communicate in a non-interference manner. The source code file from the critical development action itself will also be checked-in to a pre-existing local source control solution (e.g., Git). In this manner, there will be a fully traceable history of every edit made to the given source file, and the blockchain will have a history of every hash of these edited files, attesting to their authorization and authenticity. This allows a complete audit of each source file in the project, providing strong evidence attesting to exactly what changes were made, when, and by whom. This provides a powerful tool to detect unauthorized or malicious edits to source code. If a developer tries to edit with insufficient TADA tokens, the transaction will not be stored on the blockchain. This enforces the authorization and schedule conditions. The developer would need to receive an approval from the project administrator to perform more work via receiving more TADA tokens.

Upon performing some amount of editing on various source code files (modules) that constitute a software project, the next major step in the development process is compiling the source files into their corresponding object files. This is accomplished by invoking a compiler having a blockchain-enabled capability such that each produced object file is associated with a transaction record representing the compilation operation that will be incorporated into the blockchain. The compiler may reside in a different SDE with respect to the developer client SDE, such as the DevOps server. Similar to the process described for editing, compilation is a transaction where the blockchain-enabled compile process includes several steps. First, a hashing program generates a hash of the main memory image of the authorized compiler based on the aforementioned secure enclave technology. This hash is incorporated into the attestation report, which is subsequently incorporated into the compilation transaction message to the blockchain processing nodes. Second, the hashing program generates a hash of the input source code module, and gathers local information about the developer such as the ID authentication from a secure ID smart card (such as, but without limitation, a Common Access Card (CAC) and CPU ID of the local host), and incorporates this information into the transaction message. The local developer uses the PARANOID environment to compile the source file, and the hashing program generates a hash of the output object file resulting from compilation. This information is conveyed to the PARANOID network as a transaction message to be processed into a compile transaction record to be stored on the blockchain. The compile transaction information sent to the blockchain contains the following fields: 1) the name of the object file resulting from compilation; 2) the hash of the file being compiled; 3) the fully qualified path of the source file that the object file was compiled from; 4) the hash of the source file that the object file was compiled from; 5) a timestamp of when the object file was compiled; 6) the version of the compiler used; 7) the hash of the executable of the compiler used; 8) the public key of the developer performing this compile; 9) the address that will receive the TADA Tokens exchanged in this transaction; 10) the address that will be charged TADA Tokens for this transaction (namely the developer submitting the compile); 11) the amount of TADA tokens charged for the compile development action; 12) the attestation revision information of Intel Corporation SGX; and, 13) the attestation enclave digital signature from Intel Corporation SGX.

When the compile transaction information is sent to the blockchain, it enforces a requirement that the source file being compiled matches a version of that source file present on the blockchain. If it does not match, this indicates that the source file is not one of the recognized versions of the file and, therefore, cannot be traced back to the authorized development process. So, the compile transaction does not complete and an error is logged. Any subsequent compilation of a file will send an updated transaction that is appended to the existing list of updates, providing a full compile history of the file, from its first compile to its current state. The blockchain will have a history of every compilation of that file, as well as a cross-reference to the edit transaction ledger for the source file. This allows a complete audit of each object file in the project, as well as the source file and compiler used to generate it from that source. This audit provides strong evidence of exactly when a source file was compiled, by whom, and using which tool. It provides a powerful tool to detect unauthorized or malicious edits to the compile process. If a developer tries to compile without a positive balance of TADA tokens, by policy of the blockchain processing nodes, the transaction will be rejected for incorporation into the blockchain. This enforces the authorization and schedule conditions by preventing changes in software after the development schedule has concluded. The developer would need to receive an approval from the project administrator to perform more work via receiving more TADA tokens.

Once all source files are built into their corresponding compiled object files, the subsequent critical development stage is to link the object files to create an executable binary. In a Naval avionics application, this is what would target a Single Board Computer (SBC) residing in an avionics system Weapons Replaceable Assembly (WRA). When the developer invokes the link transaction, in a manner similar to the previously described stages, the link operation will gather data about all of the object files being used to build the executable, as well as the corresponding data about the source files for those object files. The link process will enforce the requirement that all of the constituent object files and their corresponding source files match what is currently tracked on the blockchain. This prevents the use of any unauthorized files in the creation of an executable. The hash of the linker program, based on the attestation report of the CPU secure enclave technology used to generate the executable, is also written to the blockchain ledger, providing defense against unauthorized modifications to the linker component of the toolchain. PARANOID embeds metadata in the executable file during the generation process. This metadata includes all the fully qualified file paths and hashes of the object files that were linked to form the executable, along with their corresponding source files and hashes, as well as the linker attestation report data. This adds powerful traceability to the developed software as each component set of source files and object files can be cross-referenced by comparing their hashes with the tamper-resistant blockchain entries to ensure that only files that are authorized, and whose provenance is fully attested to by the blockchain, were used in the building of the executable. The following data for linking transactions is stored on the blockchain: 1) the hash of the linked executable; 2) the hash of the linker used; 3) the version of the linker used; 4) the public key of the developer performing this link; 5) a timestamp of when the executable file was linked; 6) a Linker Instance Number which serves as an index number for this link operation, referencing and tying together all of the developers who contributed to any file involved in this linking transaction; 7) an attestation revision information of Intel Corporation SGX; and 8) an attestation enclave digital signature of Intel Corporation SGX.

The Linker Instance Number in the linking transaction is used to keep track of every developer who worked on files that are used in a particular execution of the linking process. There will be a Linker Instance Transaction for every developer who appears in any of the source files or object files being used by the linker to generate the executable. In this way, each developer can be charged TADA tokens, ensuring that each object file was compiled by a currently authorized developer on the project and is traceable to a source file developed by a currently authorized developer. If any developer does not have sufficient TADA tokens to continue with the link, the transaction will not be stored on the blockchain and the executable will not be generated. The information for the set of linker instance transactions is: 1) a unique identifier consisting of the developer's secure ID and other local data, for example, the development host CPU serial number; 2) the TADA tokens virtual wallet address that will receive the amount in this transaction; 3) the TADA tokens virtual wallet address that will be charged for this transaction; and, 4) the amount of TADA tokens that is being charged. Once the executable is built, it can be run like any other executable. The embedded PARANOID metadata does not alter the executable instructions or other data components of any of the constituent object files. It exists in its own section of the executable.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A method to implement traceability and provability on a particular project in software development based on blockchain-recorded transactions of assigned developer time, the method comprising of the following steps:

setting up a blockchain network comprised of a distributed, redundant, and tamper-resistant ledger, the ledger stored redundantly among a network of nodes, each node storing its own identical copy in a blockchain service design, the ledger storing records of transactions involving developers performing critical development functions in software development, the development functions comprising of performing source code edits, performing software compilations using an approved compiler program to create object files, performing linking using an approved linker program to combine the object files to create executable binaries, performing manipulation of binary with a packer to provide for memory efficient storage of the binary, and performing a manipulation of one or more binaries to create a distribution and installation format for distributing software to an endpoint target platform to provide for the convenient and correct installation of software on the endpoint target platform, the development function of compilation further involving embedding of metadata into the resulting binary such that the binary is mathematically verified and completely traceable before loading onto the endpoint target platform, the metadata includes file paths, computer equipment identifications, and hashes to trace the binary to source code files, equipment, and personnel used to generate the binary to prove that there has been no unauthorized modification;

collecting and storing hashes and metadata to the blockchain during the course of editing, compiling, and linking, in order to create an executable, storing to the blockchain an edit action: file path of the source code file, hash of the current version of the source code file, hash of the last version of the source code file, wherein the version is set to zero with the first version of that file, project identification number, developer username, software development environment version number, code revision number, hardware enclave hash, blockchain transaction identification number, and a timestamp of the edit, storing to the blockchain a compile action: file path of the object file, object file hash, file path of the source code file, source code file hash, file path of the compiler being used, hash of the compiler being used, developer username, code revision number, hardware enclave hash, blockchain transaction identification number, and a timestamp of the compilation, storing the following information to a link action on the blockchain: file path of the executable, hash of the executable, linker version number, hash of the linker, developer usernames of all developers who have contributed to the linking operation, project identification number, code revision number, hardware enclave hash, the blockchain transaction identification number, a timestamp of the link;

issuing each user an attestable pre-fabricated and signed virtualized environment on approved hardware that comes with functionality required for the user's role implemented as one of a set of virtual machine templates fashioned from a signed and approved pre-fabricated image, the users' virtualized environments issue commands to the blockchain network based on user actions; the network of nodes communicate amongst themselves via blockchain consensus protocols to manage the state of the ledger and any updates that result from those issued commands; and, verifying that developer is authorized to submit transactions to the project and if so, record each development action on the ledger to enable extensive tracking and auditing of end-to-end software development process.

\* \* \* \* \*